United States Patent [19]

Butler

[11] Patent Number: 5,503,202
[45] Date of Patent: Apr. 2, 1996

[54] RADIUS CURVE LOG SAWING APPARATUS AND METHOD

[76] Inventor: William R. Butler, P.O. Box 506, Janesville, Calif. 96114

[21] Appl. No.: 426,975

[22] Filed: Apr. 24, 1995

[51] Int. Cl.⁶ ....................................................... B27B 1/00
[52] U.S. Cl. ............................... 144/357; 83/368; 83/370; 83/820; 30/380; 144/361; 144/356; 144/376; 144/378
[58] Field of Search .................................. 83/200.1, 368, 83/370, 817, 820, 825; 30/380; 144/2 R, 3 R, 356, 357, 361, 376, 378

[56] References Cited

U.S. PATENT DOCUMENTS

| | | |
|---|---|---|
| 340,964 | 4/1886 | Thomas . |
| 1,732,743 | 8/1927 | Dougherty . |
| 2,876,809 | 6/1956 | Rentsch et al. . |
| 4,144,782 | 3/1979 | Lindstrom ................................. 83/732 |
| 4,193,192 | 3/1980 | Cortez . |
| 4,458,567 | 7/1984 | Tuomaala . |
| 4,895,197 | 1/1990 | Andersen . |
| 4,930,556 | 6/1990 | Prihoda . |
| 5,291,927 | 3/1994 | Gönner . |

FOREIGN PATENT DOCUMENTS

| | | |
|---|---|---|
| 116338 | 9/1926 | Switzerland . |
| 489632 | 2/1976 | U.S.S.R. . |
| 579140 | 11/1977 | U.S.S.R. . |
| 632566 | 11/1978 | U.S.S.R. . |
| 827304 | 5/1981 | U.S.S.R. . |
| 1142276A | 2/1985 | U.S.S.R. . |
| 17372 | 11/1988 | United Kingdom . |
| 2221187 | 1/1990 | United Kingdom . |

*Primary Examiner*—W. Donald Bray
*Attorney, Agent, or Firm*—Richard C. Litman

[57] ABSTRACT

A sawing process and apparatus cuts a log longitudinally along a radius curve to produce boards. The sawing apparatus includes a continuous flexible band saw blade, provided with teeth at one or both edges. A support exposes a section of saw blade that is curved and stabilized by the use of electromagnetic fields in cooperation with rollers. The saw is then configured to make a cut of a desired thickness in a curve parallel the growth rings of a log, in an arc which minimizes the number of knot defects in the board. With each pass of the log through the saw, or vice-versa, a new arc section is cut, and the log or the saw is rotated and positioned for the next arc section cut. Plural sawing stations may be used in series, and the process may be run bi-directionally when using double-edged saw blades. Once the board sections are cut, they are flattened under pressure in a kiln. Triangular grooves may be cut prior to delivery to the kiln, and adhered together afterwards to facilitate the flattening operation for small radius boards.

13 Claims, 2 Drawing Sheets

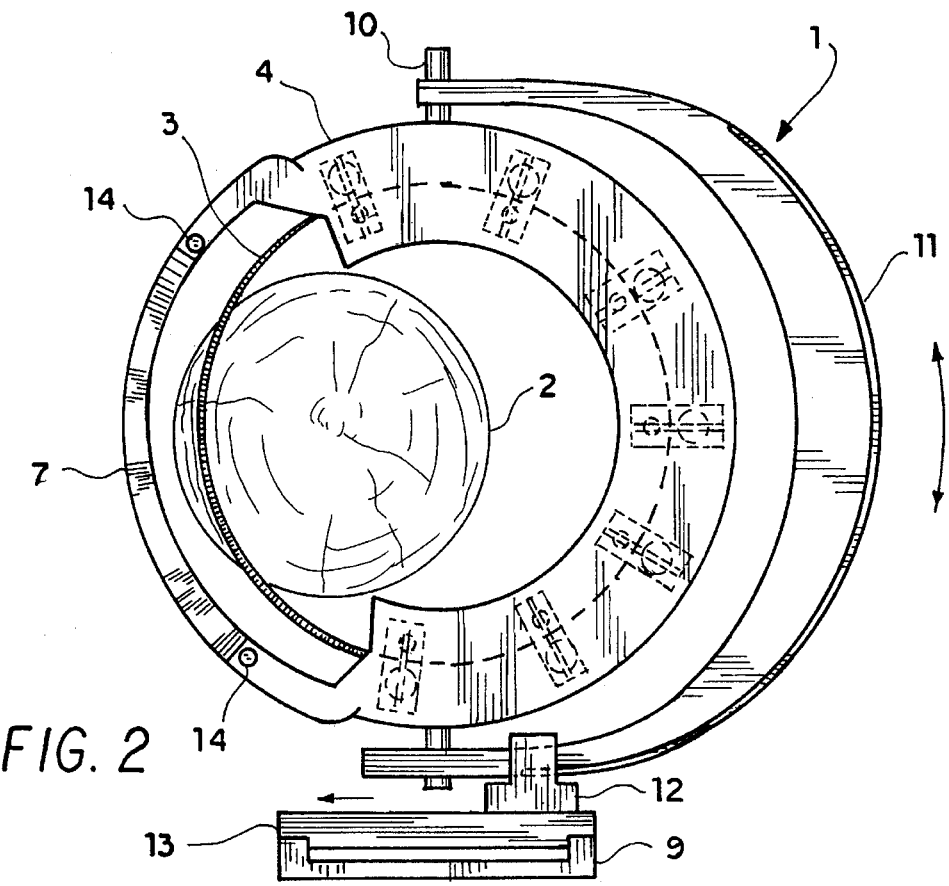

RADIUS CURVE LOG SAWING APPARATUS AND METHOD

BACKGROUND OF THE INVENTION

1. Field of the Invention

The present invention relates to lumber. More particularly, the present invention relates to processes and apparatuses for cutting logs into boards.

2. Description of the Prior Art

In the lumber industry, logs are typically processed by longitudinal straight cutting, first to form a cant, and then to produce boards. Since trees grow radially, straight cutting sacrifices fiber yield in the final board product. Further, the presence of defects, such as knots is disadvantageous since a single knot will appear in all boards cut through it. Unless the cut is exactly tangential to the knot, the deleterious effect of these defects is magnified since the surface area and volume of each knot occupies a greater portion of the board, thereby requiring complete rejection or at least down-grading the lumber produced. When logs used are from old growth or trees of otherwise exceptional quality, the board yield from straight cutting is acceptable because the concentration of defects is naturally, or by definition low. However, diminishing supply of such trees, and the heavy environmental implications of over-harvesting old growth has created a need for producing wooden boards from logs with a higher concentration of defects and/or from less environmentally damaging new growth trees.

Continuous band saws which are supported and driven by rollers in a housing have been used in cutting boards from logs. The cutting area is invariably a straight edge in saws so used, despite the disadvantages of straight cutting, described above. Further, the lumber industry uses thick saw blades with wide kerfs, requiring large horsepower electric motors to drive the saws. This is due to extreme tension placed on the saw in order to maintain saw travel, guide, and drive. Saw blades must accordingly be of a thickness to withstand such tension, having a lower limit of ⅛" when high tensile materials are used.

Stephan, British Patent No. 17,372, describes a band saw for cutting sections of lumber, in which the saw moves along the length of the log, making a longitudinal cut. U.S. Pat. Nos. 340,964; 2,876,809; and 4,193,192 describe various saw blade drives and support rolls for a continuous band saw.

Moriya in UK Published Patent Application GB 2 221 187 A, and U.S. Pat. No. 4,458,567 to Tuomaala describe various shape and dimension detection techniques for maximizing the lumber output quantity and/or quality. Soviet Patent SU 1142276 A to the Mosc. Forestry Inst. describes the determination of a given sector of a log having the highest concentration of knots.

U.S. Pat. No. 1,732,743 to Dougherty describes a process for cutting logs in which the log is split into wedge cants, the core removed, and the cants are further cut into boards. U.S. Pat. No. 4,895,197 to Andersen describes a method and apparatus for sawing logs with a trio of straight circular saws. U.S. Pat. No. 4,930,556 to Prihoda describes a method for pealing a log for veneers, in which a straight blade is applied along the full length of the log, and a spiral cut through growth curves is made.

The Maksimov patent, SU 632566 describes the use of electromagnetic induction to stabilize a flexible steel tape blade. Soviet Patents 489632 and 579140 describe the use of magnets to secure continuous band saws onto associated rollers and/or other guide means. An apparatus in which a band saw blade is held in a curve for sharpening purposes is described by Swiss Patent No. 116,338, to Eisermann et al. U.S. Pat. No. 5,291,927 to Gönner describes a device for straightening wooden boards by applying opposite pressure.

None of the above inventions and patents, taken either singly or in combination, is seen to describe the instant invention as claimed.

SUMMARY OF THE INVENTION

The present invention provides a sawing process and apparatus wherein a log is longitudinally cut along a radius curve to produce boards. The sawing apparatus includes a continuous ring flexible saw blade, provided with teeth at one or both edges. The blade is supported in a C-shaped housing with paired rollers providing a path and drive. The open part of the support exposes a curved section of saw blade, as opposed to the straight section of conventional band saws. The curvature of the blade is controlled and/or stabilized through this open section by the use of magnetic fields in cooperation with the guide rollers.

The housing may be mounted in a gimbal assembly to provide adjustability in a plurality of dimensions, thereby allowing the log and saw to be relatively positioned to maximum advantage. The inevitable sweep and crook of logs may thus be followed and irregularities compensated for to provide greater yield.

The present invention allows thinner saw blades to be utilized because less tension is placed on the blade by the combination of magnetic fields and guide rollers. The tension requirements are especially reduced when electromagnetic stabilizers and close tolerances in the housing are used in combination with magnetic, pneumatic, or hydraulic roller control. Thinner blades advantageously create less sawdust, and the apparatus as a whole requires less power than those of the prior art.

In operation, a log is positioned and secured in line with the above saw. The log is inspected to determine the location of high concentrations of knots or other defects, and the curvature of the log is noted. The saw is then configured to make a cut of a desired thickness in a curve parallel the growth rings of the log, in an arc which minimizes the number of knot defects in the board by starting/ending the cut at a line of high knot concentration. With each pass of the log through the saw (or vice-versa) a new arc section is cut, and the log or the saw is rotated for the next.

Once the board sections are cut, they may be flattened under pressure, and may further be groove cut, and adhered to facilitate flattening. This process produces lumber at high production speeds, with nearly 100% fiber conversion to lumber. The lower tension requirements and thinner blades produce less sawdust, thereby increasing yield.

Accordingly, it is a principal object of the invention to provide processes and apparatuses for cutting boards from logs which maximize the yield of high quality lumber.

It is another object of the invention to use logs from new or young growth trees to produce lumber having old growth characteristics.

It is a further object of the invention to produce boards of greater unbroken width, since the circumference, rather than the diameter of the log determines the maximum board width.

It is still another object of the invention to provide lumber in which defects such as knots are removed, and/or their presence in boards is minimized.

It is an object of the invention to provide new and improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a side view of one of the radius curve band saws.

FIG. 3 is a perspective cutaway detail of a drive/roller arrangement from within the saw housing.

FIG. 4a is a side view of a radius cut board showing optional grooving.

FIG. 4b is a side view of the same board, after straightening.

Similar reference characters denote corresponding features consistently throughout the attached drawings.

DETAILED DESCRIPTION OF THE PREFERRED EMBODIMENTS

Figure 1:
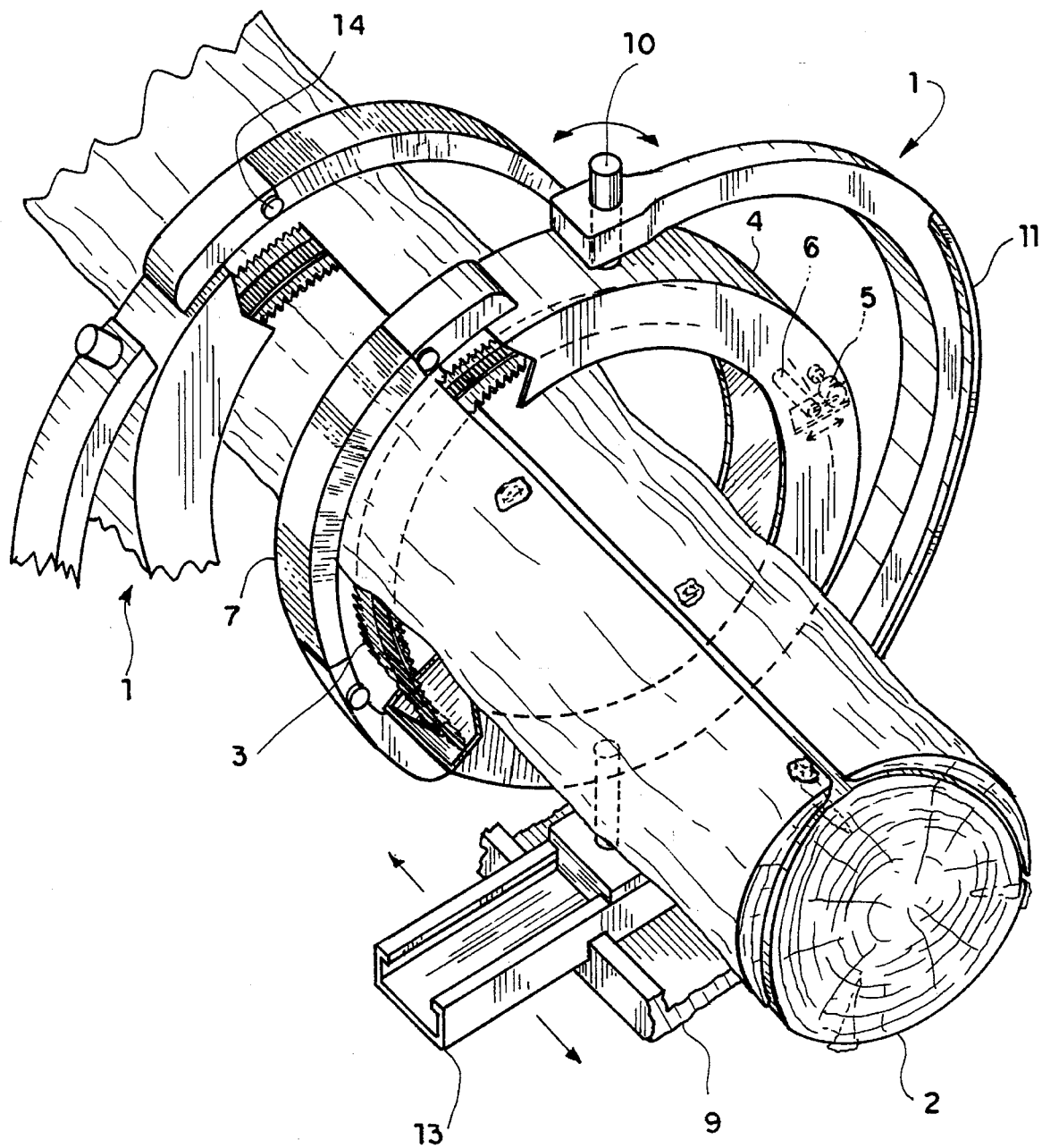
FIG. 1 is a perspective view of an apparatus according to the present invention showing two radius curve band saws in the process of longitudinally cutting a pair of boards from a log.

Referring to FIG. 1 of the drawings, the present invention includes an apparatus wherein one or more radius cut saws 1 are used to longitudinally cut boards from a log 2 along a radius curve. Radius cut saw 1 includes a continuous saw blade 3, a support housing 4, drive rolls 5, guide rolls 6, and an electromagnet 7. Saw blade 3 may include teeth 8 along one or both edges, and is made of metallic materials. For the purposes of the present invention, the blade must have magnetic or para-magnetic properties, so as to be influenced by a magnetic field. These materials include iron, steel, or the like, and may be admixed coated, or embedded in a diverse, non-magnetic material. These may include synthetic composites of fibrous tapes such as nylon with iron coated or imbedded therein.

The thickness of blade 3 may be of reduced thickness and/or of materials having less tensile strength than those of the prior art. Rather than steel blades of 1/8" thickness, the usually lower bound for straight cut saw blades used in cutting boards, the present blades may be reduced to half the thickness with no ill effects, and/or may be made with less expensive materials noted above.

Radius cut saw 1 may be fixed and log 2 delivered thereto. Alternatively saw 1 may be moved longitudinally along the length of the log, such as within track 9. Preferably, saw 1 is mounted to provide a plurality of adjustable positions. As better seen is FIG. 2, saw 1 may be mounted to a gimbal assembly. This gimbal assembly includes pins 10, an keel 11, and sleeve 12. Sleeve 12 may further be laterally adjusted along a track 13, which is in turn longitudinally movable within track 9. Thus, the preferred embodiment would have rotational freedom around pins 10, and arcuate adjustability as keel 11 travels through sleeve 12. This allows the saw to adjust to the contours and irregularities of the log, as well as the ability to position the revealed portion of saw blade 3 along an optimal arc.

The length and curvature of the revealed portion of blade 3 is determined by the use of electromagnetic fields in cooperation with the guide and drive rolls. Preferably, magnet 7 includes an electromagnet within a flexible sleeve, which can change its curvature by contraction and expansion of its length between pins 14, by any suitable means. The power and configuration of the magnet pulls the exposed part of blade 3 providing an arc.

As best seen in FIGS. 2 and 3, the drive rolls 5 and guide rolls 6 are paired in an assembly, on opposite sides of saw blade 3. At least the rollers adjacent to the opening are radially movable, such as between the pulleys 15 along chain 16. As the paired rolls move radially inward, the length of saw exposed increases. Subjected to the pull of magnet 7, the curvature of saw blade 3 increases. This allows the present saw to cut an arc of a reduced radius corresponding to the decreasing radius of a log's growth rings.

The rollers may advantageously incorporate additional mechanisms to control the movement of sawblade 3, and to secure it thereon. This may include providing an expansible guide roller bladder in which pneumatic or hydraulic pressure may be controlled, providing adjustable tension and/or friction between the guide roller and drive roller. Additionally, the drive roller, guide roller, or both may be magnetized to similar effect. Preferably, a drive sprocket 17 cooperating with slots 18 in the blade are used to provide positive gearing. Most preferably, the slots have rounded edges to reduce wear. Each drive roll may be individually driven, by a motor mechanism housed in drive roll 5, or all may be driven together as by a drive chain. When individually driven, the tension between roller pairs may be isolated and adjusted, as needed. Optionally, sensors for detecting the tension between any roller pair may be deployed.

To provide cooling, as well as lubrication, fluids may be delivered to the blade while it is coursing through housing 4. Preferably, a continuous backflow of water is provided in the housing along the blade, as is conventional in heavy duty band saws currently used in the lumber industry.

The apparatus is employed by positioning a log in line with at least one radius cut saw 1. This may be performed by providing a platform onto which the log placed, securing the log by chucking on both ends, and removing the platform, thereby suspending the log between chucks. Alternatively, the log may be supported by longitudinal rails, or other conveyer mechanism. Chucking is preferred because it provides no obstacle to the adjustment of saws to an optimal position, such as along keel 11.

The log is then inspected to determine the location of high concentrations of knots or other defects, and the curvature of the log is noted. Preferably an optical scan of the log surface, which may be then provided as data input for a computer, is used. The disclosures of U.S. Pat. No. 4,458,567 is herein incorporated by reference. The device described by UK Patent Application GB 2 221 187 A may also be advantageously used. With this data a cut of a desired thickness in a curve parallel the growth rings of the log may be calculated and the result used to control the relative longitudinal movement of the log and saws, and the positioning of saw 1 in gimbal assembly. In particular, an arc which minimizes the number of knot defects in the board may be achieved by starting and ending a cut at a line of high knot concentration. These lines may be detected since trees tend to grow branches roughly along longitudinal lines, though not always in quadrants. With each pass of the log through the saw (or vice-versa) a new arc section is cut, and the log or the saw is rotated for the next cut. Additionally, plural sawing stations may be used in series, as shown in FIG. 1, and the process may be run bi-directionally, if the saws are double-edged.

Once the board sections are cut, they may be flattened under pressure. As seen in FIG. 4a, the product of the above process will be curved to a greater or lesser extent, depending on the radius of the log when the board was cut. The boards may be easily straightened by applying pressure in a kiln, such as used to treat wood conventionally, or by a positive straightening step, as illustrated in U.S. Pat. No. 5,291,927, previously mentioned, and herein incorporated. If necessary, grooves 19 may be cut at intervals along the length of a board 20, the product of the saw, of high curvature before being sent to the kiln. Adhesive would then be added in the cut to facilitate flattening.

It is to be understood that the present invention is not limited to the sole embodiment described above, but encompasses any and all embodiments within the scope of the following claims.

I claim:

1. An apparatus for sawing radius cut boards from a log having a radius cut saw comprising:

a metallic continuous blade;

a support housing through which said continuous blade courses, said housing having an opening in which said continuous blade is exposed;

guide rollers within said support housing upon which said continuous blade courses;

means for driving said continuous blade over said guide rollers;

means for adjusting said guide rollers radially within said housing; and a magnet positioned radially outward of said continuous blade, where said blade is exposed by said housing, said magnet drawing said blade in the length exposed by said housing into an arc.

2. The apparatus of claim 1, wherein a plurality of said radius cut saws are positioned to produce a plurality of radius cut boards in series.

3. The apparatus of claim 2, wherein two radius cut saws are deployed, such that a board cut by one of said radius cut saws is adjacent in an arc around said log from a board cut by the other of said radius cut saws.

4. The apparatus of claim 1, wherein said continuous blade has two cutting edges, such that the apparatus may cut logs in a bi-directionally along a longitudinal axis.

5. The apparatus of claim 1, wherein said means for driving said continuous blade over said guide rollers include drive rollers, and a power source.

6. The apparatus of claim 5, wherein each of said drive rollers is radially paired with one of said guide rollers forming a roller pair, such that said continuous blade travels between said drive rollers and said guide rollers.

7. The apparatus of claim 6, further comprising means for providing tension to said continuous blade between the drive roller and the guide roller of each roller pair.

8. The apparatus of claim 7 wherein said means for providing tension is magnetic.

9. The apparatus of claim 7 wherein said means for providing tension is pneumatic.

10. The apparatus according to claim 1 wherein said magnet positioned radially outward of said continuous blade is an electromagnet having adjustable strength.

11. The apparatus according to claim 1 further comprising a gimbal assembly, wherein said radius cut saw is mounted in said gimbal assembly to provide rotational and arcuate adjustability thereto.

12. The apparatus according to claim 11 wherein said gimbal assembly comprises pins rotatably connecting said assembly to said radius cut saw, an arching keel upon which pins are mounted at opposite ends, and a sleeve through which said keel slides; whereby said radius cut saw may follow the sweep, crook, or irregularities of said log.

13. A process for producing radius cut lumber from a log comprising the steps:

a) determining the curvature of the log;

b) positioning a blade of an apparatus according to claim 1 such that the curvature of said blade is substantially equal to said curvature of said log;

c) longitudinally cutting said log into radius cut boards; and d) straightening said radius cut boards to produce boards having substantially flat grain.

* * * * *